United States Patent [19]
Yano

[11] Patent Number: 6,018,213
[45] Date of Patent: Jan. 25, 2000

[54] ULTRASONIC MOTOR

[75] Inventor: Motoyasu Yano, Toyohashi, Japan

[73] Assignee: Asmo Co., Ltd, Shizuoka-pref., Japan

[21] Appl. No.: 09/196,610

[22] Filed: Nov. 18, 1998

[30] Foreign Application Priority Data

Nov. 21, 1997 [JP] Japan ................................. 9-321573

[51] Int. Cl.$^7$ ............................................. H01L 41/08
[52] U.S. Cl. ...................................................... 310/323.12
[58] Field of Search .................... 310/323.02, 323.12, 310/323.16, 333

[56] References Cited

U.S. PATENT DOCUMENTS

| | | | |
|---|---|---|---|
| 4,663,556 | 5/1987 | Kumada | 310/323.12 X |
| 5,051,647 | 9/1991 | Uchikawa | 310/323.12 |
| 5,376,858 | 12/1994 | Imabayashi et al. | 310/323.12 X |
| 5,448,128 | 9/1995 | Endo et al. | 310/323.12 |
| 5,763,981 | 6/1998 | Okazaki et al. | 310/323.12 |

FOREIGN PATENT DOCUMENTS

A-7-75353 of 1995 Japan.
A-9-182469 of 1997 Japan.

*Primary Examiner*—Mark O. Budd
*Attorney, Agent, or Firm*—Fish & Richardson P.C.

[57] ABSTRACT

An ultrasonic motor having a stator for generating a vibration therein and a rotor rotatably disposed on the stator is designed so that an electric power for driving the motor is efficiently converted to a rotational force. The rotor is designed so that its resonant frequency becomes equal to a resonant frequency of the stator. Therefore, the resonant vibration in the stator having a peak amplitude is efficiently transferred to the stator which has the same resonant frequency. A plurality of slanted slits for converting a longitudinal vibration into a twisting vibration may be provided on the stator or both of the stator and the rotor. The slanted slits further enhance efficiency of the ultrasonic motor and may be used to selectively rotate the rotor in two directions.

19 Claims, 10 Drawing Sheets

FIG. 2
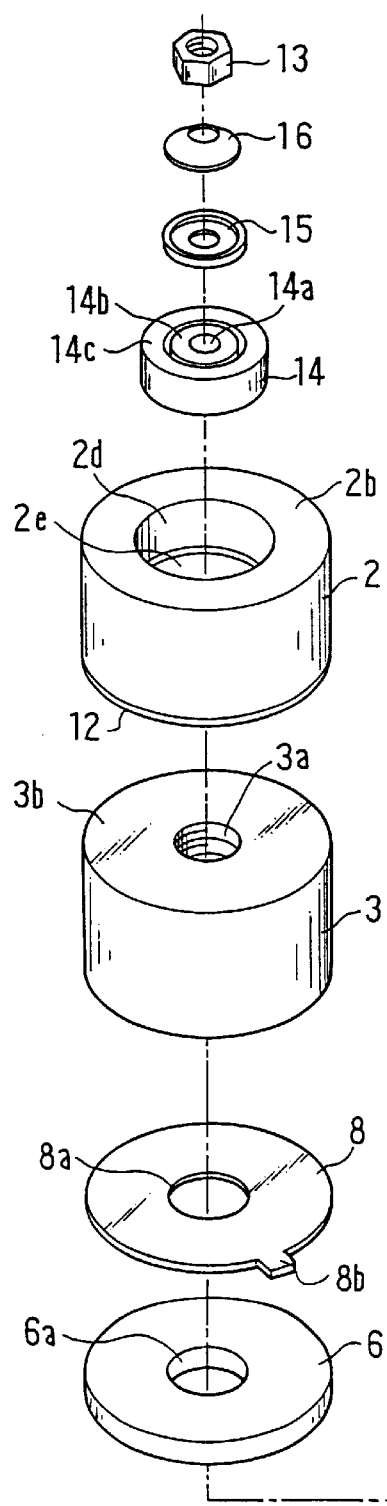
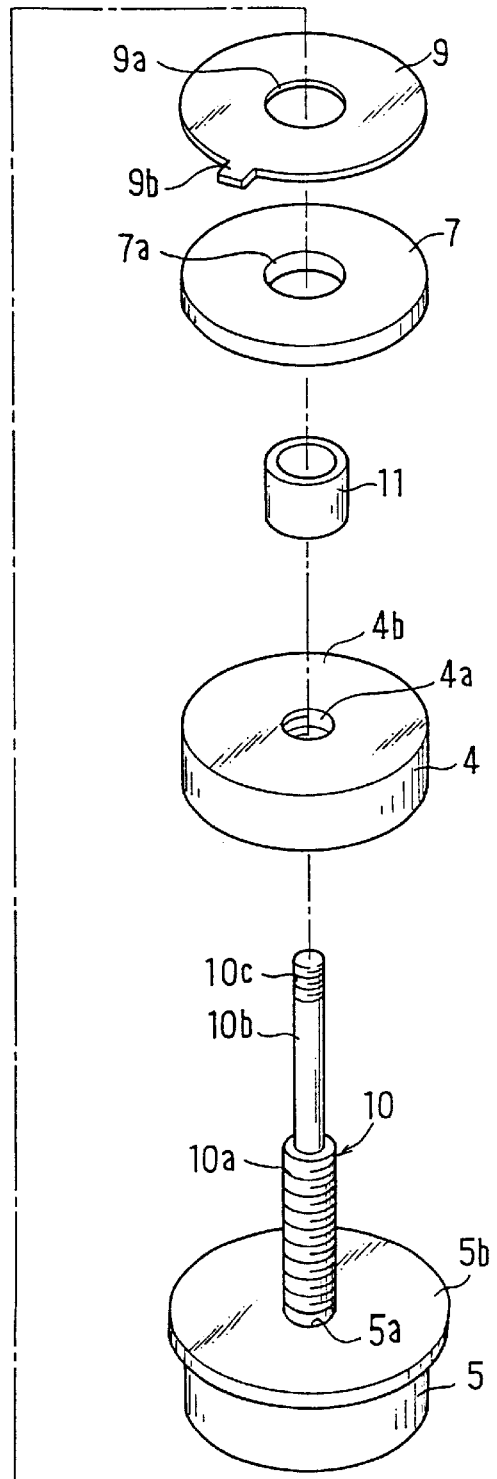

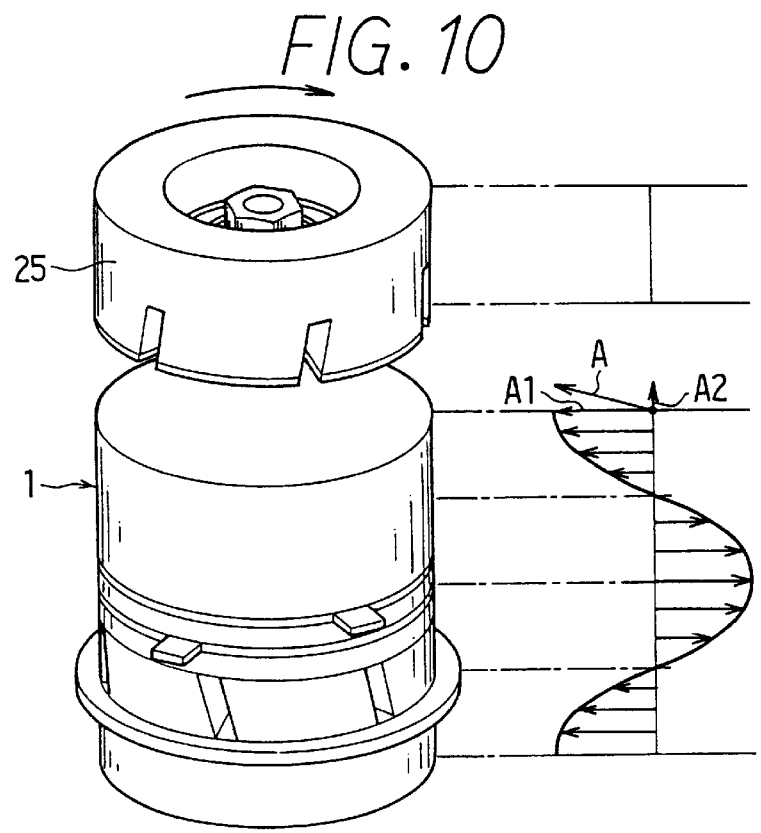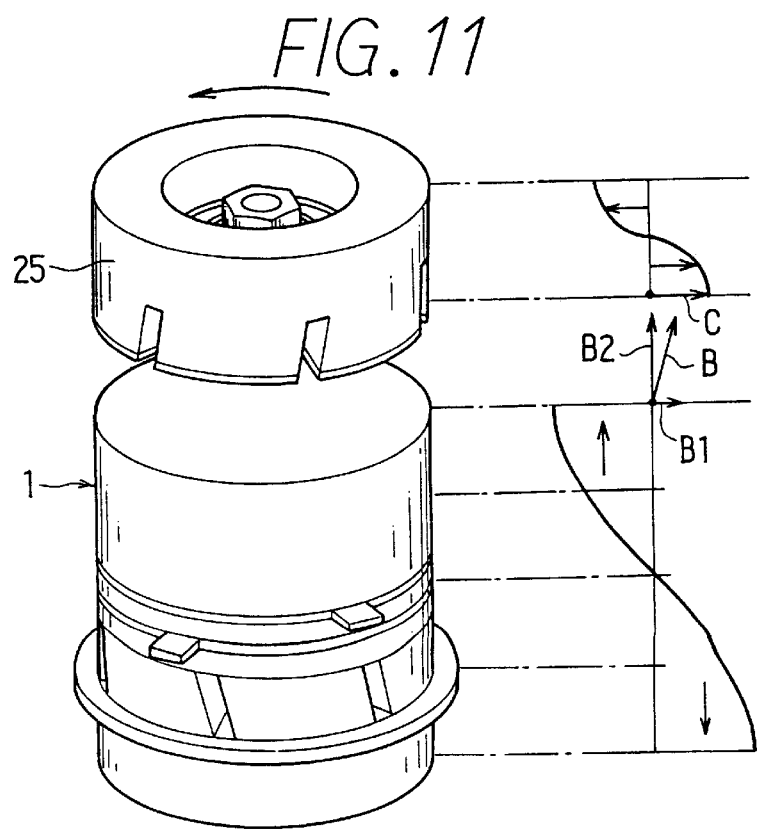

ULTRASONIC MOTOR

CROSS-REFERENCE TO RELATED APPLICATION

This application is based upon and claims benefit of priority of Japanese Patent Application No. Hei-9-321573 filed on Nov. 21, 1997, the content of which is incorporated herein by reference.

BACKGROUND OF THE INVENTION

1. Field of the Invention

The present invention relates to an ultrasonic motor having a stator vibrated by a piezoelectric element and a rotor rotating slidably in contact with the stator.

2. Description of Related Art

An example of a conventional ultrasonic motor driven by standing-wave is shown in FIG. 19. The ultrasonic motor is composed of a stator 51 and a rotor 50. The stator 51 includes blocks 52–54, piezoelectric elements 55, 56, and electrode plates 57, 58. All the components of the stator 51 and the rotor 50 are connected by a through-bolt 59 and a nut 60, so that the rotor 50 slidably rotate in contact with the stator 51. One of the blocks 53 has slanted slits 53a formed thereon. When a high frequency voltage is imposed on the piezoelectric elements 55, 56, the piezoelectric elements generate a longitudinal vibration. A part of the longitudinal vibration is converted into a twisting vibration by slits 53a. The longitudinal and twisting vibrations are combined into a compound vibration which appears on a top surface of the stator 51. The rotor 50 slidably contacting the top surface of the rotor is rotated by the compound vibration. However, an efficiency in converting the longitudinal vibration into the twisting vibration by the slits is not sufficiently high in the conventional motor, which results in a low efficiency of the motor.

Also, another type of the ultrasonic motor which includes a piezoelectric element for generating a twisting vibration in place of the block 53 having the slits 53a has been known hitherto. The piezoelectric element for generating the twisting vibration is composed of plural pie-shaped elements, each element being polarized in a different direction from a neighboring element. The rotor is rotated by a compound vibration generated by both piezoelectric elements for the longitudinal vibration and the twisting vibration. Since the piezoelectric element for generating the twisting vibration is additionally required in this structure, and both piezoelectric elements have to be separately driven by high frequency voltages, the ultrasonic motor becomes complex and expensive.

SUMMARY OF THE INVENTION

The present invention has been made in view of the above-mentioned problems, and an object of the present invention is to provide an ultrasonic motor having a high efficiency and a high torque which can be manufactured at a low cost. Another object of the present invention is to provide a method of designing and driving such an efficient ultrasonic motor.

A cylindrical rotor made of a metallic material such as stainless steel is disposed on a cylindrical stator made of a metallic material such as aluminum, so that the rotor rotates relative to the stator based on vibrations generated in the stator and transferred to the rotor. A pair of piezoelectric elements which generate a longitudinal vibration in the stator are disposed in the stator. The vibration generated in the stator is a resonant vibration having a resonant frequency of the stator. The rotor is designed so that it has a rotor resonant vibration frequency which is the same as the stator resonant vibration frequency. The longitudinal vibration transferred to the rotor is converted into a twisting vibration in the rotor. Since both of the longitudinal vibration in the stator and the twisting vibration in the rotor are resonant vibrations having a peak amplitude at the resonant frequency which is common to the stator and the rotor, electric power for driving the motor is efficiently converted to a rotational force.

The ultrasonic motor may be designed so that a stator resonant frequency-region overlaps with a rotor resonant frequency-region if both resonant frequencies are not completely equal. This is because a high vibration amplitude can be obtained if the vibration frequency is in a vicinity of the resonant frequency.

The stator may include a plurality of slanted slits for converting the longitudinal vibration generated by the piezoelectric elements into the twisting vibration. In this case, too, the rotor is designed so that it has a resonant frequency which is equal to the resonant frequency of the vibration in the stator. The rotor may include a plurality of slanted slits for converting the longitudinal vibration of the stator into a twisting vibration which functions as a rotating force.

It is also possible to apply to the stator one driving voltage for rotating the rotor in one direction and another driving voltage for rotating the rotor in the other direction. In this case, the rotor is designed so that its resonant frequency matches a resonant frequency of the one driving voltage and does not match a resonant frequency of the other driving voltage. When the driving voltage having the unmatched resonant frequency is applied, the rotor is rotated in one direction by a twisting vibration in the stator. When the driving voltage having the matched resonant frequency is applied, the longitudinal vibration in the stator is converted by slanted slits formed on the rotor into a twisting vibration in the rotor, and thereby the rotor is rotated in the other direction. The slanted slits of the rotor have to be slanted in a direction opposite to the slanted slits formed on the stator in order to attain the above operation.

Other objects and features of the present invention will become more readily apparent from a better understanding of the preferred embodiments described below with reference to the following drawings.

BRIEF DESCRIPTION OF THE DRAWINGS

FIG. 2 is a perspective view showing components of the ultrasonic motor shown in FIG. 1, each component being taken apart from one another;

FIG. 10 is a perspective view showing the ultrasonic motor shown in FIG. 7, illustrating a compound, longitudinal and twisting vibrations generated therein when piezoelectric elements are energized by a specific frequency;

FIG. 11 is a perspective view showing the ultrasonic motor shown in FIG. 7, illustrating a compound, longitudinal and twisting vibrations generated therein when piezoelectric elements are energized by another specific frequency;

DETAILED DESCRIPTION OF THE PREFERRED EMBODIMENTS

Figure 1:
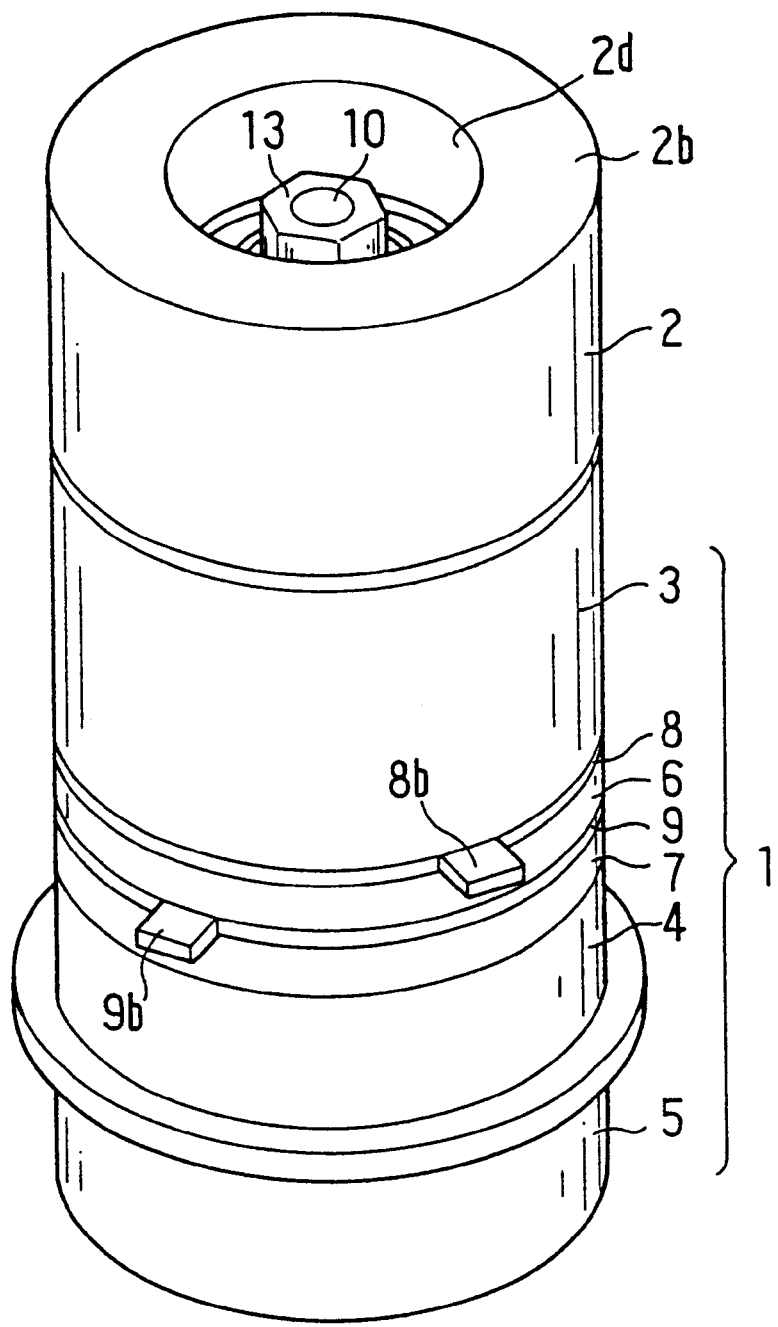
FIG. 1 is a perspective view showing an ultrasonic motor as a first embodiment of the present invention.
Figure 3:
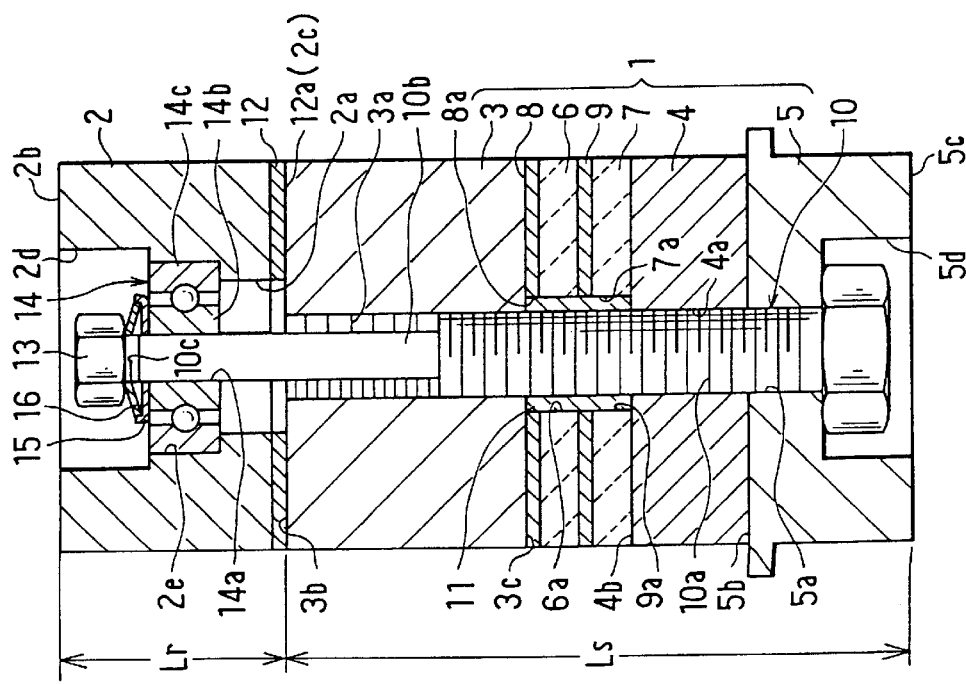
FIG. 3 is a cross-sectional view showing the ultrasonic motor shown in FIG. 1.

Referring to FIGS. 1–3, an ultrasonic motor as a first embodiment of the present invention will be described. The ultrasonic motor is composed of a stator 1 and a rotor 2. The stator 1 is composed of a first block 3, a first electrode plate 8, a first piezoelectric element 6, a second electrode plate 9, a second piezoelectric element 7, a second block 4, and a third block 5, all of those components being stacked together in this order from the top of the stator 1. The first, second and third blocks 3, 4, 5 are made of a conductive material which is aluminum in this particular embodiment. The blocks 3, 4, 5 are cylinder-shaped and have respective threaded holes 3a, 4a, 5a formed in the center thereof, as shown in FIGS. 2 and 3. The first block 3 has an upper surface 3b contacting the rotor 2 and a lower surface 3c contacting the first electrode plate 8. The second block 4 has an upper surface 4b contacting the second piezoelectric element 7 and a lower surface contacting the third block 5. The first and second piezoelectric elements 6, 7 are interposed between the first block 3 and the second block 4. The first electrode plate 8 is interposed between the first block 3 and the first piezoelectric element 6, and the second electrode plate 9 is interposed between the first piezoelectric element 6 and the second piezoelectric element 7. The first and second piezoelectric elements are disc-shaped and have respective through-holes 6a, 7a. A polarization direction of the first piezoelectric element 6 is opposite to that of the second piezoelectric element 7. The first and second electrode plates 8, 9 are disc-shaped, and have respective through-holes 8a, 9a formed at the center thereof and respective terminals 8b, 9b for supplying high frequency voltages therefrom to energize the piezoelectric elements 6, 7.

As shown in FIG. 3, all the stator components are stacked together and connected by a through-bolt 10. The through bolt 10 has a bottom head, a threaded portion 10a, a rod portion 10b and an upper threaded portion 10c. The first and second electrode plates 8, 9 and the first and second piezoelectric elements 6, 7 are insulated from the through-bolt 10 by an insulation bushing 11 inserted in the respective through-holes. The bottom head of the through-bolt is disposed in a recess 5d of the third block 5, and the rod portion 10b of the through-bolt 10 extends upwardly from the upper surface 3b of the first block 3.

The rotor 2 is disposed on the upper surface 3b of the first block 3, so that the rotor 2 slidably rotates in contact with the stator 1. The rotor 2 is made of stainless steel and cylinder-shaped. The rotor 2 has an upper surface 2b and a lower surface 2c. The outer diameter of the rotor 2 is the same as that of the stator 1. The rotor 2 has a first recess 2d, a second recess 2e and a through-hole 2a formed at its center in this order from the top thereof. A lining 12 having a contact surface 12a is attached to the lower surface 2c of the rotor 2. The contact surface 12a slidably contacts the top surface of the stator 1, so that the rotor 2 rotates relative to the stator 1. A bearing 14 having an inner race 14b and an outer race 14c is disposed in the second recess 2e. The outer race 14c is held by the rotor 2 and the inner surface 14a of the inner race 14b is fixed to the rod portion 10b of the through-bolt 10. A spring retainer 15 is placed on an upper surface of the inner race 14b, and a disc spring 16 is interposed between the spring retainer 15 and a nut 13. The nut 13 is screwed to the upper threaded portion 10c of the through-bolt 10, so that the rotor 2 is slidably connected to the stator 1.

A process of designing the ultrasonic motor described above will be explained below. First, a first resonant frequency fs1 of the longitudinal vibration of the stator 1 is calculated. When the piezoelectric elements 6, 7 are driven, a longitudinal vibration appears on the top surface (the upper surface 3b of the first block 3) of the stator 1. The longitudinal vibration shows resonant peaks (relative maximum) by sweeping the frequency of the voltage supplied to the piezoelectric elements. The first resonant frequency fs1 of the logitudinal vibration means a lowest resonant frequency at which the longitudinal vibration shows a peak among other resonant frequencies. In case the stator 1 has a cylindrical shape as in the embodiment of the present invention, the fs1 is calculated according to the following known formula.

$$fs1 = \{1/(2Ls)\} \cdot (E/\rho_1)^{1/2} \qquad (1),$$

where Ls is a length of a cylindrical body (a length of the stator 1 as shown in FIG. 3), E is a longitudinal elastic modulus of the cylindrical body, and $\rho_1$ is a density of the cylindrical body. Since the stator 1 of the present embodiment is made of aluminum, E and $\rho_1$ are those of aluminum.

Secondly, dimensions of the rotor 2 are determined based on the fs1 calculated as above. Since the outer diameter of the rotor 2 is the same as that of the stator 1, the length Lr of the rotor 2 is determined so that a first resonant frequency fr1 of the twisting vibration of the rotor 2 becomes equal to the fs1. A part of the longitudinal vibration of the stator is converted to the twisting vibration of the rotor which shows peaks (relative maximum) at certain frequencies. The first resonant frequency fr1 of the twisting vibration of the rotor means a lowest frequency at which the vibration shows a peak. Since the rotor 2 is cylinder-shaped, the fr1 is calculated according to the following known formula.

$$fr1 = \{1/(2Lr)\} \cdot (G/\rho_2)^{1/2} \qquad (2),$$

where Lr is a length of a cylindrical body (a length of the rotor 2 as shown in FIG. 3), G is a lateral elastic modulus of the cylindrical body, and $\rho_2$ is a density of the cylindrical body. Since the rotor 2 of the present embodiment is made of stainless steel, G and $\rho_2$ are those of stainless steel. Under the condition that fr1=fs1, Lr is determined by the following formula.

$$Lr = (G/\rho_2)^{1/2}/(2fs1) \qquad (3)$$

The length of the rotor Lr is set at the length calculated above. Under this condition, the twisting vibration of the rotor 2 occurs with the frequency fr1 when the longitudinal vibration is generated on the stator 1 with the frequency fs1.

The ultrasonic motor designed as above is driven in the following manner. A driving voltage having the frequency fs1 is supplied to the terminals 8b, 9b of both electrode plates 8, 9. The driving voltage is imposed on both the first and second piezoelectric elements 6, 7 with opposite polarities to each other, because the second electrode plate 9 is common to both piezoelectric elements 6, 7, and the first electrode plate 8 is in contact with the first piezoelectric element 6 while the first electrode plate 8 is electrically connected to the lower surface of the second piezoelectric element 7 through the through-bolt 10 and the second block 4. Both of the piezoelectric elements 6, 7 are polarized in opposite directions as mentioned above. Therefore, upon imposition of the driving voltage, both piezoelectric elements expand or contract in a same direction, which causes the longitudinal vibration with a large amplitude. Thus, the stator 1 vibrates in the longitudinal direction with the first resonant frequency fs1. The longitudinal vibration of the stator 1 is transmitted to the rotor 2 and generates the twisting vibration on the lower surface of the rotor 2 contacting the stator 1. The resonant frequency of the twisting vibration of the rotor 1 is fr1 which is equal to fs1. The longitudinal vibration gives a floating force to the rotor, and the twisting vibration of the rotor gives a rotational force.

Features and advantages of the ultrasonic motor as the first embodiment of the present invention are summarized as follows. (1) The stator 1 is designed so that it vibrates in the longitudinal direction with a peak amplitude with the first resonant frequency fs1. The rotor 2 is also designed so that it has the twisting vibration having a peak amplitude with the first resonant frequency fr1 which is the same as fs1. Therefore, the ultrasonic motor can be rotated efficiently with a high torque. (2) The longitudinal vibration of the stator is efficiently converted to the twisting vibration of the rotor without providing slits. Therefore, the ultrasonic motor can be manufactured at a low cost. (3) In case the slits for converting the longitudinal vibration to the twisting vibration are provided, it is necessary to strictly control a torque for fastening components of the stator to effectively convert the longitudinal vibration to the twisting vibration. Since no slits are provided in the present embodiment, such strict torque control is not needed. (4) The first resonant frequency which is the lowest resonant frequency is selected. Therefore, an electric circuit for generating the driving voltage can be made relatively simple.

The first embodiment described above may be modified in various forms, as exemplified in the following. Though the rotor is designed so that the fr1 becomes equal to the fs1, it may be modified so that a fs1-region overlaps with at least a part of a fr1-region. The fs1-region means a frequency region covering a predetermined vicinity of the fs1. Upon imposition of a driving voltage having a frequency in fs1-region, the longitudinal vibration may not have a resonant peak amplitude but it has at least a semi-resonant amplitude. The fr1-region means a frequency region covering a predetermined vicinity of the fr1. The twisting vibration caused by the longitudinal vibration may not have a resonant peak amplitude but it has at least a semi-resonant amplitude. When the ultrasonic motor is driven by a voltage having a frequency which is within an overlapped region of the fs1-region and the fr1-region, both the longitudinal and twisting vibrations have a semi-resonant amplitude. In this modification, similar effects as in the first embodiment can be attained.

Since there are plural resonant frequencies of the longitudinal vibration of the stator, that is, second, third, fourth . . . resonant frequencies in addition to the first resonant frequency fs1. Respective resonant frequency-regions may be considered as a whole in the same manner as in the first resonant frequency-region (fs1-region). The same thing is applied to the resonant frequencies of the twisting vibration of the rotor. In this respect, it is possible to determine the dimensions of the rotor so that any one of the resonant frequency-regions of the longitudinal vibration overlaps at least any one of the resonant frequency-regions of the twisting vibration of the rotor. For example, the dimensions of the rotor may be determined so that the frequency fs1 overlaps with a second resonant frequency-region of the twisting vibration of the rotor. The rotor may be designed so that a part of a second resonant frequency-region of the stator overlaps with the first resonant frequency fr1 of the rotor. Further, the rotor may be designed so that the fs1-region overlaps with the second resonant frequency-region of the twisting vibration of the rotor. Further, the rotor may be designed so that a third resonant frequency of the longitudinal vibration of the stator becomes equal to a second resonant frequency of the twisting vibration of the rotor. Various modifications other than those exemplified above may be possible.

Though the stator length Ls and the rotor length Lr are calculated according to the known formulae (1)–(2), they may be calculated based on a finite element method (FEM) which will be described later. When the FEM is used, more precise results may be obtained, considering other factors such as densities of the piezoelectric elements 6, 7 and the bearing 14.

Figure 4:
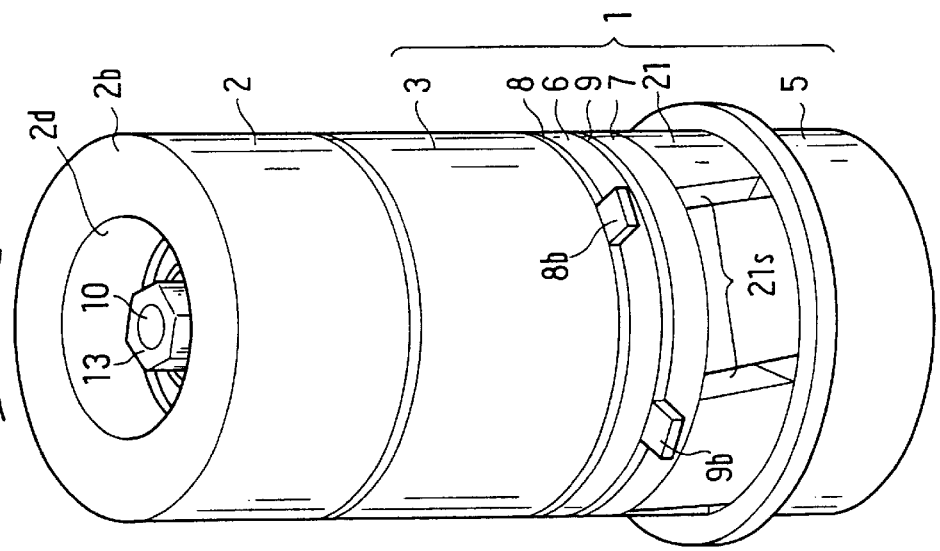
FIG. 4 is a perspective view showing an ultrasonic motor as a second embodiment of the present invention.
Figure 5:
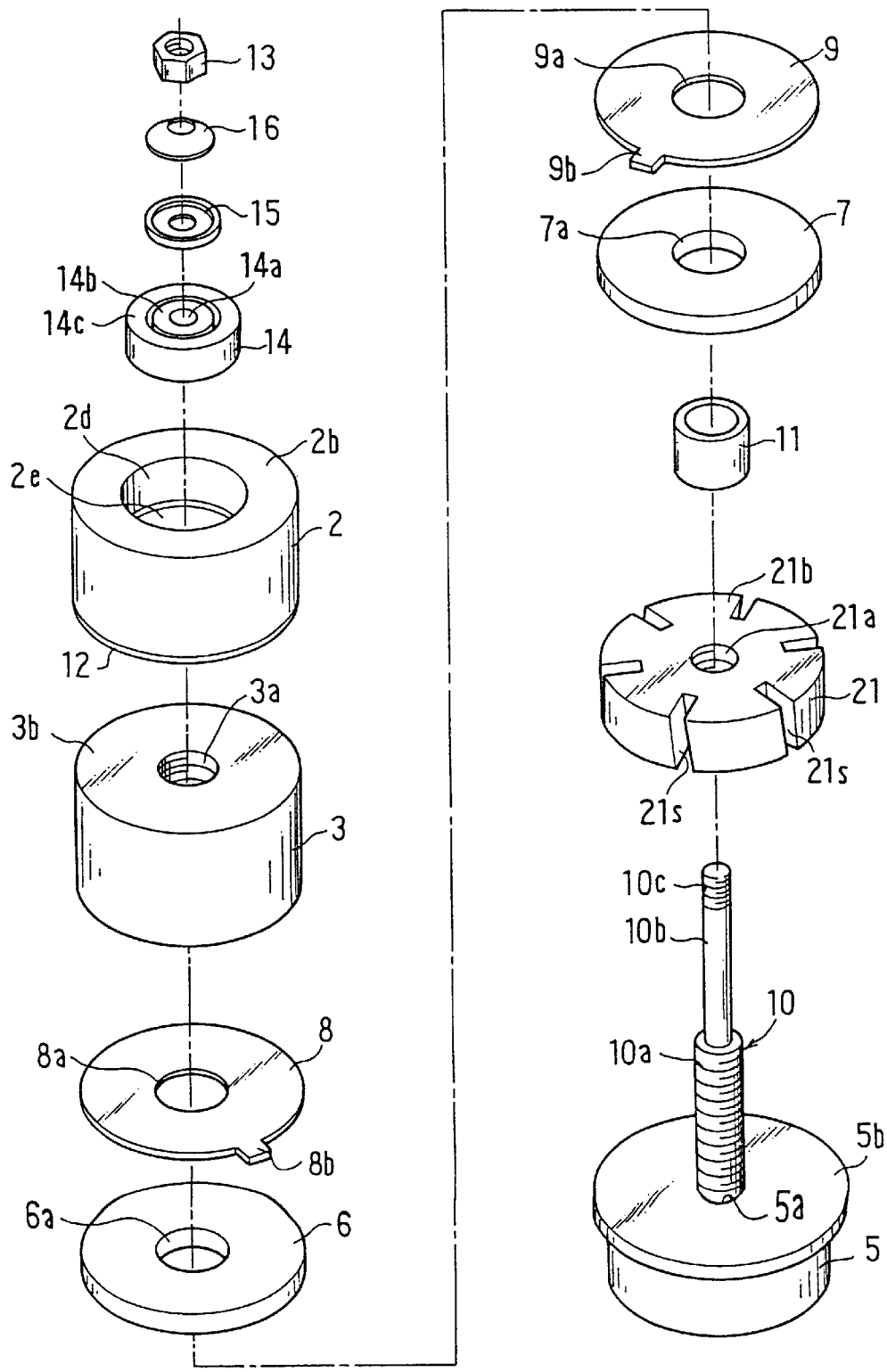
FIG. 5 is a perspective view showing components of the ultrasonic motor shown in FIG. 4, each component being taken apart from one another.
Figure 6:
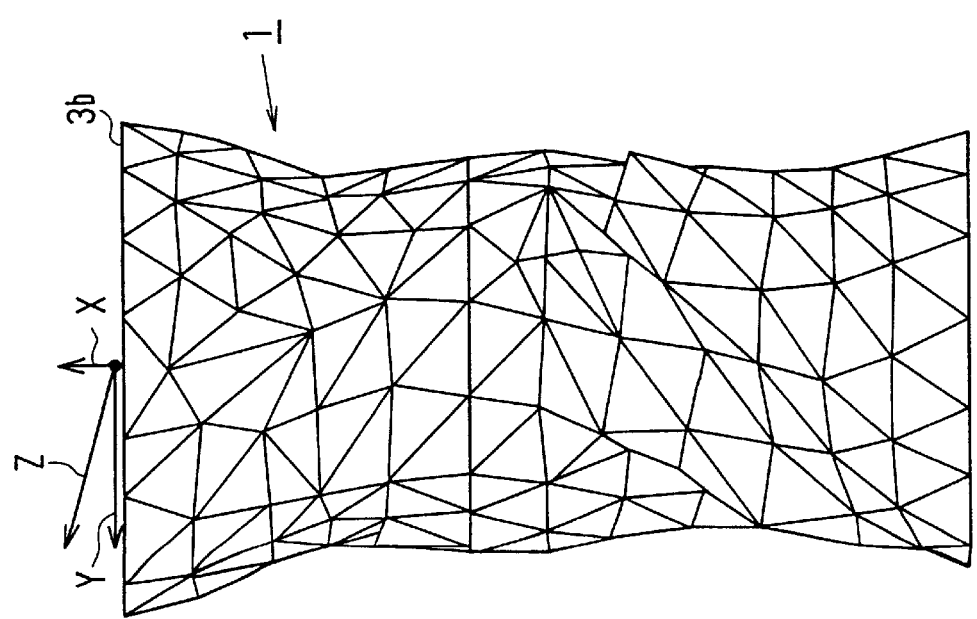
FIG. 6 is a schematic view showing a stator of an ultrasonic motor, for explaining a finite element method.

Referring to FIGS. 4–6, a second embodiment of the present invention will be described. As shown in FIGS. 4 and 5, the second block 4 of the first embodiment is replaced by a second block 21. Other components and structures of the ultrasonic motor are the same as those in the first embodiment. The second block 21 includes slits 21s for converting the longitudinal vibration to the twisting vibration. As better seen in FIG. 5, the second block 21 has an upper surface 21b, a threaded hole 21a and plural slits 21s. The slits 21s are formed with equal intervals therebetween and cut in a half way toward the center of the second block 21. The slits 21s are slanted from a lower surface toward the upper surface 21b in a clockwise direction, viewed from the outer periphery of the second block 21. Upon imposition of a driving voltage on the piezoelectric elements 6, 7, a compound vibration consisting of the longitudinal and twisting vibrations is generated on the upper surface of the stator 1, because the slits 21s convert most part of the longitudinal vibration into the twisting vibration. The twisting vibration functions as a force to rotate the rotor 2 in the clockwise direction, viewed from the top of the rotor 2.

In this embodiment, the stator 1 is driven by a high frequency voltage having a second resonant frequency fc2, and thereby a compound vibration consisting of longitudinal and twisting elements is generated on the upper surface of the stator 1. The compound vibration is a resonant vibration, and the twisting element shows a peak amplitude at the frequency fc2, but the longitudinal element does not necessarily show a peak amplitude though it is vibrated with the same frequency fc2. Though there are plural resonant frequencies for the stator 1, i.e., first, second, third . . . resonant frequencies, the second resonant frequency fc2 which is the second lowest is used in this embodiment. Since the stator 1 of this embodiment includes slits 21s, the frequency fc2 is calculated based on the finite element method (FEM), as opposed to the calculation of the frequency fs1 in the first embodiment.

Under the FEM, the stator 1 is represented by a model having a finite number of elements as shown in FIG. 6. The frequency fc2 is calculated by summing up behavior of all the elements. In FIG. 6, the compound vibration is shown by an arrow Z consisting of the longitudinal element X and the twisting element Y. After the frequency fc2 is calculated based on the FEM, a length of the rotor Lr is determined so that the first resonant frequency fr1 of the twisting vibration of the rotor 2 becomes equal to the frequency fc2. Since the rotor 2 is cylinder-shaped and has the same diameter as the stator 1, the frequency fr1 is calculated according to the formula (2) which is the same formula used in the first embodiment.

$$fr1 = \{1/(2Lr)\} \cdot (G/\rho_2)^{1/2} \qquad (2)$$

The rotor length Lr is expressed by the following formula under the condition that the fr1=fc2.

$$Lr = (G/\rho_2)^{1/2}/(2fc2) \qquad (4)$$

The twisting vibration having the first resonant frequency fr1 (same as fc2) is generated in the rotor 2 having the length Lr.

The ultrasonic motor designed as above is driven by a driving voltage having the frequency fc2. The longitudinal vibration having the resonant frequency fc2 is generated in the stator 1. Most part of the longitudinal vibration is converted into the twisting vibration Y having the resonant frequency fc2 by the slits 21s. The rest of the longitudinal vibration X and the twisting vibration Y constitute the compound vibration Z. The longitudinal component X generates a twisting vibration having the resonant frequency fr1 (which is the same as fc2) on the rotor 2. Since both of the compound vibration of the stator 1 and the twisting vibration of the rotor 2 are resonant vibrations having respective peak amplitudes, the rotor 2 is rotated efficiently with a high torque and at a high speed. The longitudinal component X gives a floating force to the rotor 2, and the twisting component Y of the stator 1 combined with the twisting vibration of the rotor 2 gives a rotational force to the rotor 2. The rotor 2 rotates clockwise as shown by an arrow in FIG. 4.

The second embodiment described above may be modified in various forms, as exemplified in the following. Though the rotor is designed so that the fr1 becomes equal to the fc2, it may be modified so that a fc2-region overlaps with at least a part of a fr1-region. The fc2-region means a frequency-region covering a predetermined vicinity of the fc2. Upon imposition of a driving voltage having a frequency in fc2-region, the compound vibration of the stator may not have a resonant peak amplitude but it has at least a semi-resonant amplitude. The fr1-region means a frequency region covering a predetermined vicinity of the fr1. The twisting vibration of the rotor caused by the longitudinal element X may not have a resonant peak amplitude but it has at least a semi-resonant amplitude. When the ultrasonic motor is driven by a voltage having a frequency which is within an overlapped region of the fc2-region and the fr1-region, both of the compound vibration of the stator and the twisting vibration of the rotor have respective semi-resonant amplitudes. In this modification, similar effects as in the second embodiment can be attained.

Since there are plural resonant frequencies of the compound vibration of the stator, that is, first, third, fourth . . . resonant frequencies in addition to the second resonant frequency fc2. Respective resonant frequency-regions may be considered as a whole, in the same manner as in the second resonant frequency-region (fc2-region). The same thing is applied to the resonant frequencies of the twisting vibration of the rotor. In this respect, it is possible to determine the demensions of the rotor so that any one of the resonant frequency-regions of the compound vibration of the stator overlaps at least any one of the resonant frequency-regions of the twisting vibration of the rotor. For example, the dimensions of the rotor may be determined so that the frequency fc2 overlaps with a second resonant frequency-region of the twisting vibration of the rotor. The rotor may be designed so that a part of a first resonant frequency-region of the stator overlaps with the first resonant frequency fr1 of the rotor. Further, the rotor may be designed so that the first resonant frequency-region of the compound vibration of the stator overlaps with the second resonant fequency-region of the twisting vibration of the rotor. Further, the rotor may be designed so that a third resonant frequency of the compound vibration of the stator becomes equal to a second resonant frequency of the twisting vibration of the rotor. Various modifications other than those exemplified above may be possible.

Though the rotor length Lr are calculated according to the known formula (2), it may be calculated based on a finite element method (FEM), if it is necessary to obtain more precise results, considering other factors such as density of the bearing 14.

Figure 7:
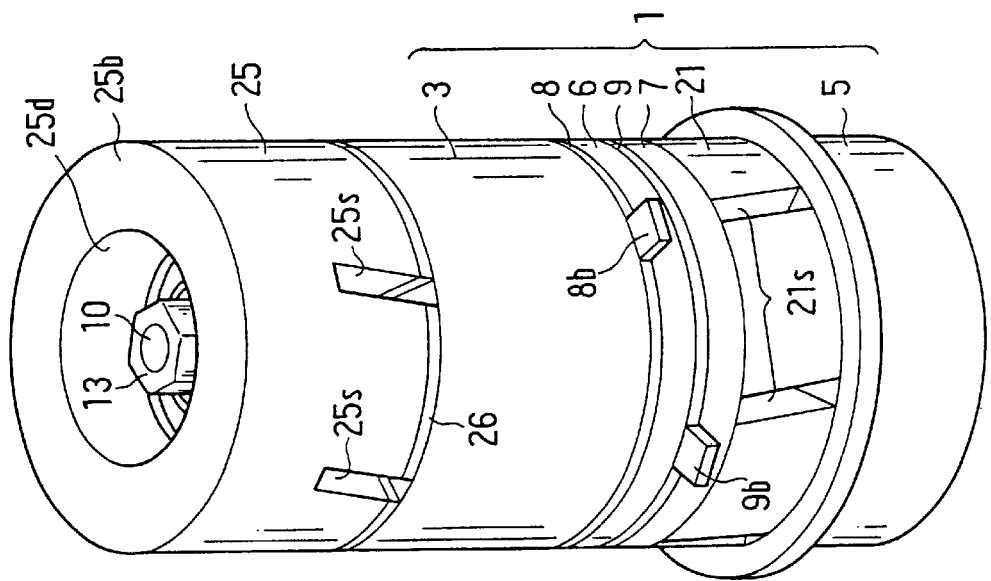
FIG. 7 is a perspective view showing an ultrasonic motor as a third embodiment of the present invention.
Figure 8:
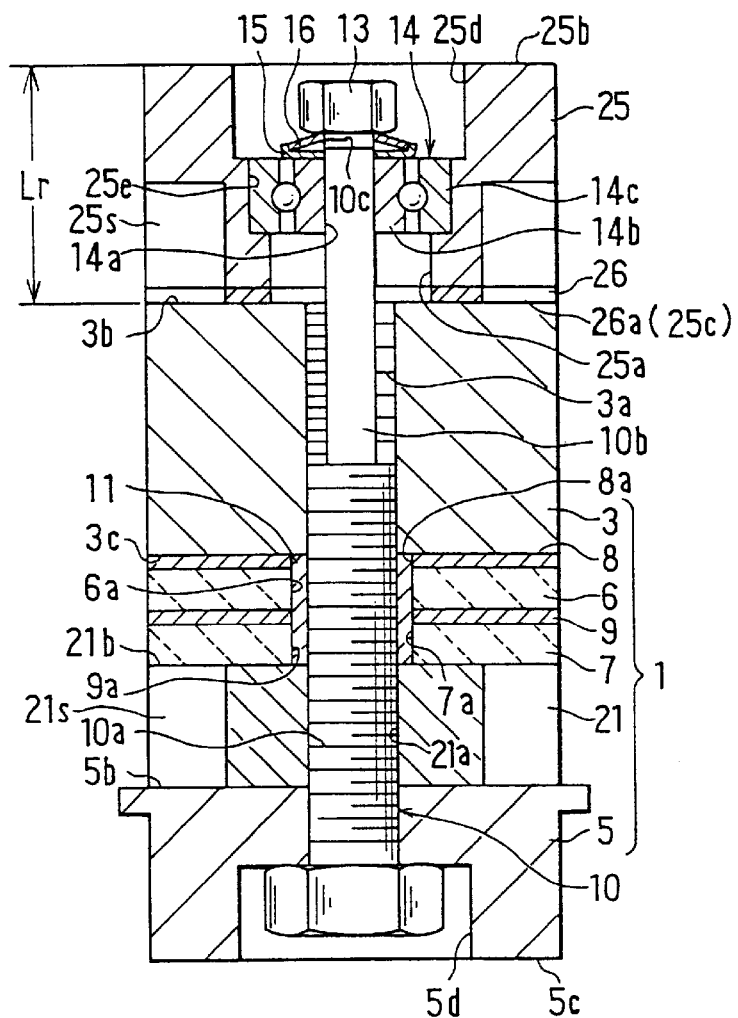
FIG. 8 is a cross-sectional view showing the ultrasonic motor shown in FIG. 7.

Referring to FIGS. 7–11, a third embodiment of the present invention will be described. In this embodiment, the rotor 2 of the second embodiment is replaced by a rotor 25, and other components and structures are the same as those of the second embodiment. As shown in FIGS. 7 and 8, the rotor 25 has an upper surface 25b, a lower surface 25c, a first recess 25d, a second recess 25e and plural slits 25s. The rotor structure is similar to that of the second embodiment, but slits 25s are additionally formed on the rotor 25. The slits 25s are formed on the cylindrical portion with equal intervals therebetween, and cut the cylindrical portion by a half way toward the center of the rotor 25. As seen in FIG. 7, the slits 25s are slanted from the lower surface 25c toward the upper surface 25b in an anti-clockwise direction, viewed from the outer periphery of the rotor 25. The rotor 25 is made of stainless steel, and a lining 26 is attached to the lower surface 25c in the same manner as in the foregoing embodiments.

The ultrasonic motor as the third embodiment is driven in both clockwise and anti-clockwise directions by applying driving voltages having one frequency fc2 and another frequency fc1. The frequency fc2 is the same frequency used in the second embodiment and calculated in the same manner as in the second embodiment. A compound vibration "A" consisting of a twisting element A1 and a longitudinal element A2 (shown in FIG. 10) is generated on the upper surface of the stator 1 when a driving voltage having the second resonant frequency fc2 is applied. The other frequency fc1 is a first resonant frequency which generates a compound vibration "B" consisting of a twisting element B1 and a longitudinal element B2 (shown in FIG. 11) on the upper surface of the stator 1. The first resonant frequency fc1 is calculated based on the FEM in the same manner as the frequency fc2.

When the driving voltage having the frequency fc1 is applied to the stator 1, the resonant longitudinal vibration B2 which shows a peak amplitude at the frequency fc1 and the twisting vibration B1 which does not necessarily show a peak amplitude at the frequency fc1 are generated on the upper surface of the stator 1. The compound vibration "B" is a vibration consisting of the twisting element B1 and the longitudinal element B2. The first resonant frequency fc1 is the lowest frequency among plural resonant frequencies which generate such a compound vibration.

Figure 9:
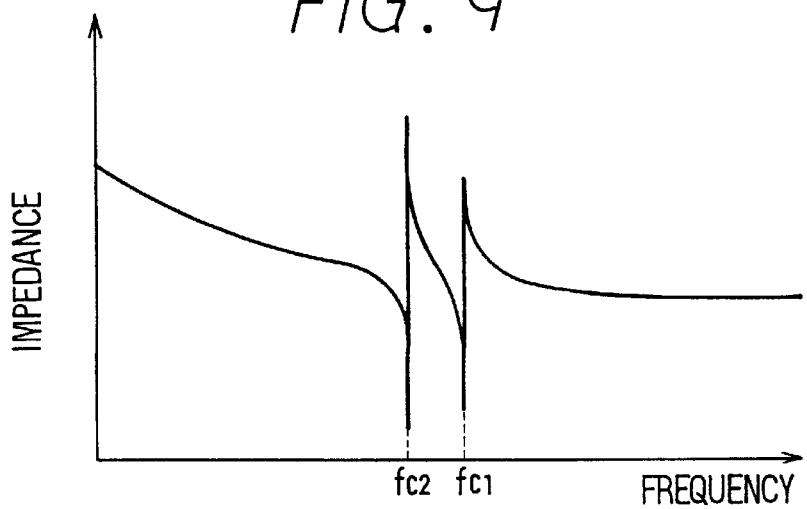
FIG. 9 is a graph showing resonant characteristics of a stator of the ultrasonic motor shown in FIG. 7.

After the first resonant frequency fc1 is calculated, the dimensions of the rotor 25 including a rotor length are determined, so that a first resonant frequency ft1 of the twisting vibration of the rotor 25 becomes equal to the frequency fc1 and does not match the frequency fc2. The twisting vibration of the rotor having the frequency ft1 gives a rotational force in the anti-clockwise direction (shown by an arrow in FIG. 11) to the rotor. The first resonant frequency ft1 is the lowest frequency among plural frequencies which generate such a twisting vibration on the rotor. Since the rotor 25 includes slits, the known formula for determining the rotor length is not sufficient. Accordingly, the FEM is used to determine the rotor length. Conditions such as the number of the slits 25s, a width and a depth of the slits 25s, and a material of the rotor are set before calculating the rotor length based on the FEM. As shown in FIG. 9, the frequencies fc1 and fc2 calculated as above are not so apart, rather, relatively close to each other.

The ultrasonic motor designed as above is driven in the following manner. First, referring to FIG. 10, the clockwise rotation of the rotor 25 will be explained. When a driving voltage having the frequency fc2 is applied to the piezoelectric elements 6, 7 of the stator 1, the piezoelectric elements 6, 7 generates a longitudinal vibration in the stator 1. Most part of the longitudinal vibration is converted into the twisting component A1 by the slits 21s, and the rest remains as the longitudinal component A2. As a result, the compound vibration "A" consisting of A1 and A2 is generated on the upper surface of the stator 1. The twisting vibration (component) A1 is a resonant vibration which shows a peak amplitude at the frequency fc2. The longitudinal vibration (component) A2 gives a floating force to the rotor 25, but does not generate a twisting vibration acting an anti-clockwise rotation on the rotor 25. Thus, the rotor 25 is rotated in the clockwise direction by the twisting vibration A1 with a high torque and at a high speed.

Secondly, referring to FIG. 11, the anti-clockwise rotation of the rotor 25 will be explained. When a driving voltage having the frequency fc1 is applied to the stator 1, the piezoelectric elements 6, 7 generate a longitudinal vibration. A small part of the longitudinal vibration is converted into the twisting vibration B1 by the slits 21s, and its large part remains as the longitudinal vibration B2. As a result, the compound vibration "B" consisting of B1 and B2 is generated on the upper surface of the rotor 25. The longitudinal vibration B2 is a resonant vibration showing a peak amplitude at the frequency fc1. The twisting vibration B1 is small but gives a rotational force in the anti-clockwise direction to the rotor 25. The longitudinal vibration B2 gives a floating force to the rotor 25 and is transmitted to the rotor 25. The transmitted longitudinal vibration is converted into the twisting vibration "C" by the slits 25s of the rotor 25. The twisting vibration "C" on the rotor is a resonant vibration which shows a peak amplitude at the frequency ft1 which is equal to fc1. Thus, the rotor 25 is rotated in the anti-clockwise direction by the twisting vibration "C" of the rotor, being somewhat helped by the twisting vibration B1, with a high torque and at a high speed.

The features and advantages of the third embodiment will be summarized as follows. (1) The second resonant frequency fc2 is used to rotate the rotor 25 clockwise. The driving voltage having the frequency fc2 generates the resonant twisting vibration which shows a peak amplitude at the frequency fc2 on the stator. Therefore, the driving power is efficiently used to rotate the rotor 25 clockwise. (2) The first resonant frequency fc1 is used to rotate the rotor 25 anti-clockwise. The rotor 25 is designed so that the twisting vibration frequency ft1 becomes equal to the frequency fc1. The longitudinal vibration generated by the driving voltage having the frequency fc1 is a resonant vibration having a peak amplitude at the frequency fc1, and the twisting vibration generated on the rotor is also a resonant vibration having a peak amplitude at the frequency ft1 (which is equal to fc1). Therefore, the rotor 25 is efficiently rotated anti-clockwise. (3) Both frequencies fc1 and fc2 are selected so that they are not so apart from each other. Therefore, a driving circuit for providing both frequencies can be made relatively simple and inexpensive.

The third embodiment described above may be modified in various forms as exemplified in the following. Though the rotor 25 is designed so that the frequency ft1 becomes equal to the frequency fc1, it may be designed so that the ft1-region overlaps with the fc1-region at least a part thereof (the frequency-region such as the ft1-region means the same as defined in the description of the first embodiment). In this case a driving voltage having a frequency which falls in the overlapped region is applied to the stator 1, and thereby the ultrasonic motor can be driven in the similar manner as in the third embodiment. The rotor 25 may be designed so that any one of the resonant frequency-regions of the longitudinal vibration of the stator 1 overlaps with any one of the resonant frequency-regions of the twisting vibration of the rotor 25 at least a part thereof. For example, the rotor dimensions may be determined so that the frequency fc1 overlaps with a ft2-region (ft2: a second resonant frequency of the twisting vibration of the rotor). The rotor may be designed so that the ft1 overlaps with a second resonant frequency-region of the longitudinal vibration of the stator. Further, the rotor may be designed so that a ft2-region overlaps with a first resonant frequency-region of the longitudinal vibration of the stator. Further, the rotor may be designed so that the ft2 becomes equal to a third resonant frequency of the longitudinal vibration of the stator. In any of the modifications exemplified above, advantages similar to those in the third embodiment can be obtained.

Figure 12:
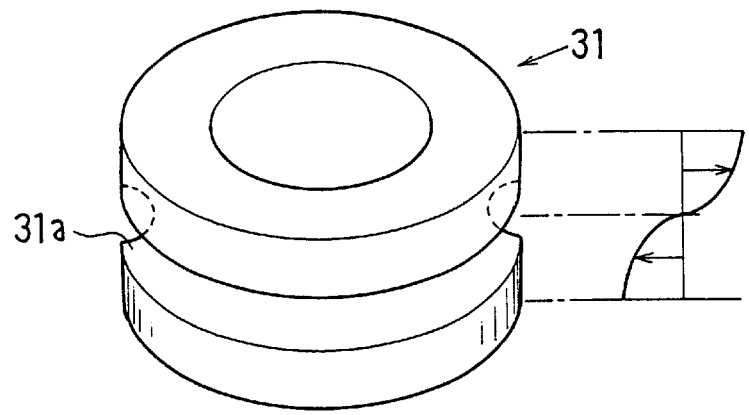
FIGS. 12–16 are perspective views showing modified rotors to be used in the first and second embodiments.
Figure 13:
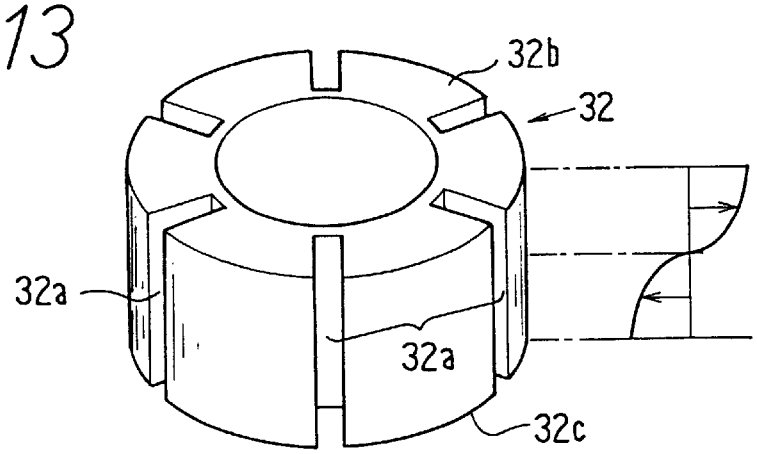
Figure 14:
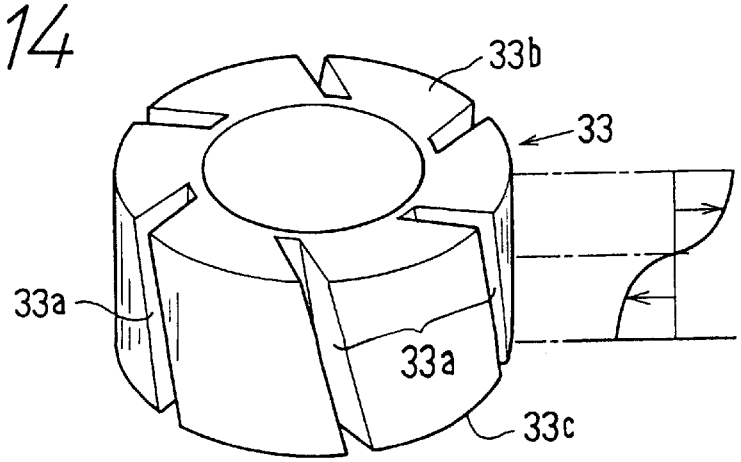
Figure 15:
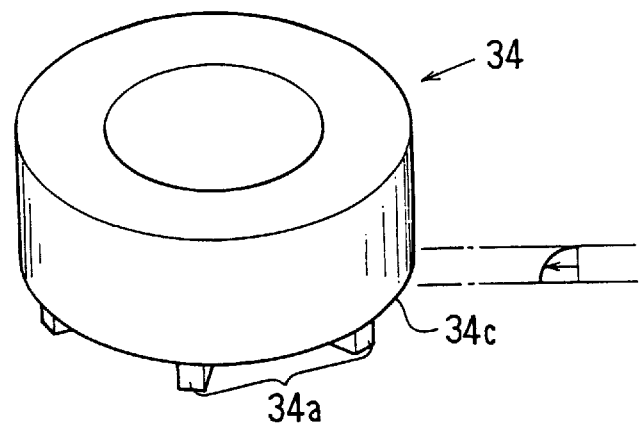
Figure 16:
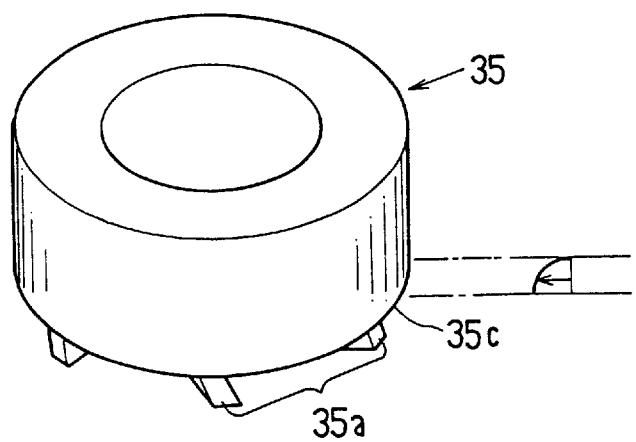

The rotor 2 used in the first and second embodiments may be replaced by various types of the rotors to further improve efficiency of the motor. Some examples are shown below. A rotor 31 shown in FIG. 12 having an annular groove 31a formed on the outer periphery thereof may be used. The groove 31a amplifies the twisting vibration generated in the rotor 31. A rotor 32 shown in FIG. 13 having vertical slits 32a may be used. The vertical slits 32a are formed with equal intervals therebetween all the way from an upper surface 32b to a lower surface 32c. The slits 32a increase the amplitude of the twisting vibration on the rotor 32. A rotor 33 shown in FIG. 14 having slanted slits 33a may be used. The slanted slits 33a are formed with equal intervals therebetween on the outer periphery of the rotor 33 all the way from an upper surface 33b to a lower surface 33c. The slanted slits 33a efficiently convert the longitudinal vibration of the stator 1 into the twisting vibration of the rotor 33. A rotor 34 shown in FIG. 15 having contact pieces 34a formed on a lower surface 34c of the rotor 34 may be used. The contact pieces 34a formed with equal intervals therebetween generate a bending vibration on the rotor 34, thereby improving efficiency of the motor. A rotor 35 shown in FIG. 16 having slanted contact pieces 35a may be used. The slanted contact pieces 35a are formed on a lower surface 35c with equal intervals therebetween. The slanted contact pieces 35a generate a large bending vibration on the rotor 35, thereby further improving efficiency of the motor.

Figure 17:
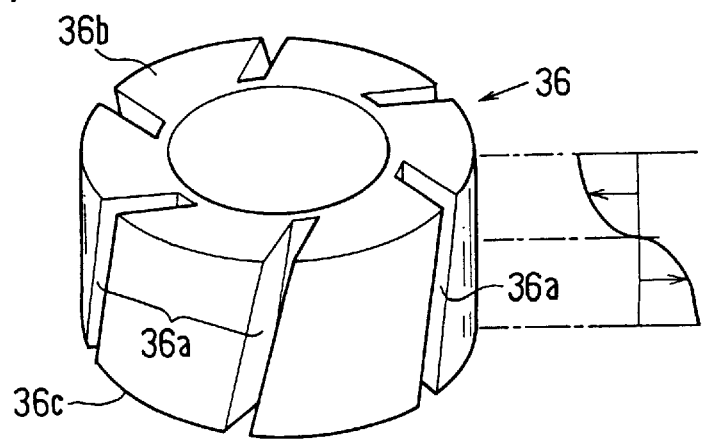
FIG. 17 is a perspective view showing a modified rotor for the third embodiment.
Figure 18:
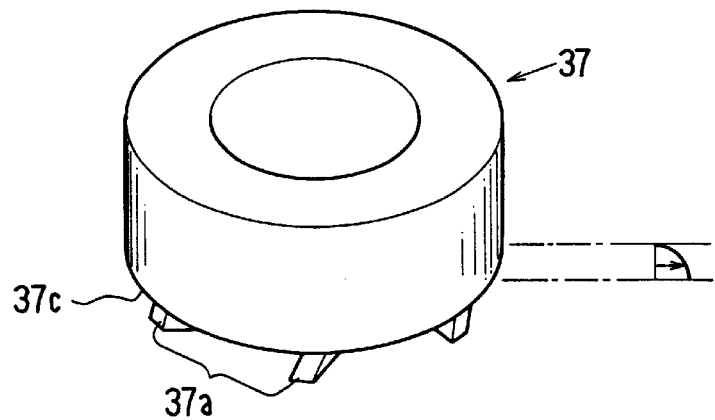
FIG. 18 is a perspective view showing another modified rotor for the third embodiment.
Figure 19:
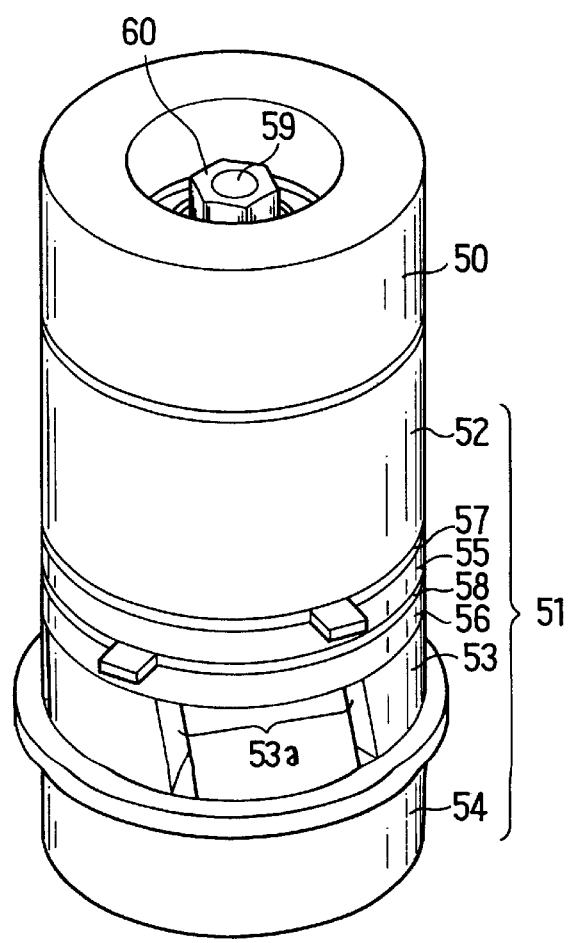
FIG. 19 is a perspective view showing a conventional ultrasonic motor.

The rotor 25 of the third embodiment may be replaced by other rotors such as those shown in FIGS. 17 and 18. A rotor 36 shown in FIG. 17 having slanted slits 36a may be used. The slanted slits 36a are formed on the cylindrical portion of the rotor 36 with equal intervals therebetween all the way from an upper surface 36b to a lower surface 36c. The slanted slits 36a are slanted in the same direction as the slits 25a of the third embodiment. The slanted slits 36a enhance efficiency in converting the longitudinal vibration into the twisting vibration. A rotor 37 shown in FIG. 18 having slanted contact pieces 37a may be used. The slanted contact pieces 37a are formed on a lower surface 37c of the rotor 37 with equal intervals therebetween and are slanted in the same direction as the slits 25a of the third embodiment. The slanted contact pieces 37c generates a bending vibration which functions as a rotational force in the anti-clockwise direction.

In determining the dimensions of the rotor, the rotor length Lr is calculated under the condition that the rotor material is stainless steel in the first and second embodiments. However, the process may be reversed. That is, the rotor material may be determined based on a predetermined rotor length. Though the finite element method (FEM) is used for calculating resonant frequencies of the stator and the rotor when they include slits formed thereon, other methods such as a boundary element method (BEM) in which a calculation model is made only from the surface of a vibrating body may be used. Further, the FEM may be applied to determination of the shape of the slits and the rotor material based on a predetermined rotor length Lr, though a process to calculate the rotor length Lr based on the shape of the slits and the rotor material which are predetermined is described above. Though a process to determine the rotor dimensions based on the resonant frequency of the stator is described above, the process may be reversed. That is, the stator dimensions may be determined based on a resonant frequency of the rotor which is calculated from the rotor dimensions and material.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An ultrasonic motor comprising:

a stator including a piezoelectric element, a vibration being generated in the stator by energizing the piezoelectric element;

a rotor slidably and rotatably contacting the stator, a vibration being caused in the rotor by the vibration of the stator, the rotor being rotated relative to stator by both vibrations of the stator and the rotor, wherein:

the vibration of the stator is generated in a resonant-frequency region;

the vibration of the rotor is generated in a resonant-frequency region; and at least a part of the resonant frequency-region of the stator overlaps with the resonant frequency-region of the rotor.

2. The ultrasonic motor as in claim 1, wherein:

the resonant frequency-region of the rotor is a region in which a twisting vibration is caused in the rotor.

3. The ultrasonic motor as in claim 2, wherein:

a resonant frequency at which the twisting vibration in the rotor shows a peak amplitude is included in the resonant frequency-region of the rotor.

4. The ultrasonic motor as in claim 1, wherein:

the rotor includes contact pieces which slidably and rotatably contact the stator; and the resonant frequency-region of the rotor is a region in which a bending vibration is caused in the rotor.

5. The ultrasonic motor as in claim 4, wherein:

a resonant frequency at which the bending vibration in the rotor shows a peak amplitude is included in the resonant frequency-region of the rotor.

6. The ultrasonic motor as in claim 1 wherein:

the resonant frequency-region of the stator is a region in which a longitudinal vibration is generated in the stator.

7. The ultrasonic motor as in claim 6, wherein:

a resonant frequency at which the longitudinal vibration in the stator shows a peak amplitude is included in the resonant frequency-region of the stator.

8. The ultrasonic motor as in claim 1 wherein:

the resonant frequency-region of the stator is a region in which a compound vibration consisting of a longitudinal vibration and a twisting vibration is generated in the stator.

9. The ultrasonic motor as in claim 8 wherein:

a resonant frequency at which the compound vibration in the stator shows a peak amplitude is included in the resonant frequency-region of the stator.

10. The ultrasonic motor as in claim 1, wherein:

the resonant frequency-region of the stator is a region which includes a first resonant frequency of the stator.

11. The ultrasonic motor as in claim 1, wherein:

the resonant frequency-region of the rotor is a region which includes a first resonant frequency of the rotor.

12. An ultrasonic motor comprising:

a stator including a piezoelectric element, a vibration being generated in the stator by energizing the piezoelectric element;

a rotor slidably and rotatably contacting the stator, the rotor being rotated relative to the stator based on the vibration of the stator, wherein:

a first compound vibration is generated in a first resonant frequency-region in the stator, the first compound vibration acting to rotate the rotor in a first direction;

a second compound vibration is generated in a second resonant frequency-region in the stator, the second compound vibration acting to cause a vibration in a rotor resonant frequency-region in the rotor, the vibration in the rotor acting to rotate the rotor in a second direction which is opposite to the first direction;

the first resonant frequency-region does not overlap with the rotor resonant frequency-region; and the second resonant frequency-region overlaps with the rotor resonant frequency-region.

13. The ultrasonic motor as in claim 12, wherein:

the first and the second resonant frequency-regions are relatively close to each other.

14. A method of determining a structure of an ultrasonic motor having a stator vibrated by a piezoelectric element and a rotor slidably rotating on the stator, the method comprising steps of:

calculating a resonant frequency-region of the stator based on a theoretical formula or a simulation analysis; and determining a structure of the rotor so that at least a part of the resonant frequency-region of the stator overlaps with a resonant frequency-region of the rotor.

15. A method of determining a structure of an ultrasonic motor having a stator vibrated by a piezoelectric element and a rotor slidably rotating on the stator, the method comprising steps of:

calculating a resonant frequency-region of the rotor based on a theoretical formula or a simulation analysis; and determining a structure of the stator so that at least a part of the resonant frequency-region of the rotor overlaps with a resonant frequency-region of the stator.

16. A method of driving an ultrasonic motor having a stator vibrated by a piezoelectric element and a rotor slidably rotating on the stator, the method comprising a step of applying a driving voltage to the stator, the driving voltage being a voltage having a frequency which falls within a region where a resonant frequency-region of the stator and a resonant frequency-region of the rotor overlaps with each other.

17. A method of driving an ultrasonic motor having a stator vibrated by a piezoelectric element and a rotor slidably rotating on the stator, the method comprising steps of:

rotating the rotor in one direction by applying a first driving voltage, a frequency of which does not fall within a region where a resonant frequency-region of the stator and a resonant frequency-region of the rotor overlaps with each other; and rotating the rotor in another direction by applying a second driving voltage, a frequency of which falls within a region where a resonant frequency-region of the stator and a resonant frequency-region of the rotor overlaps with each other.

18. An ultrasonic motor comprising:

a stator;

a piezoelectric element disposed in the stator, the piezoelectric element generating a longitudinal resonant vibration having a first stator resonant frequency in the stator; and a rotor disposed on the stator to slidably rotate relative to the stator, a twisting resonant vibration having a first rotor resonant frequency which is the same as the first stator resonant frequency being induced in the rotor by the longitudinal resonant vibration in the stator.

19. An ultrasonic motor comprising:

a stator having a plurality of slanted slits formed thereon;

a piezoelectric element disposed in the stator, the piezoelectric element generating a longitudinal resonant vibration having a second stator resonant frequency in the stator, a part of the longitudinal resonant vibration being converted into a twisting vibration by the slanted slits; and a rotor disposed on the stator to slidably rotate relative to the stator, a twisting resonant vibration having a first rotor resonant frequency which is the same as the second stator resonant frequency being induced in the rotor by the longitudinal resonant vibration in the stator.

* * * * *